W. C. Ellis,
Bevel.
No. 112,793. Patented Mar. 21, 1871.
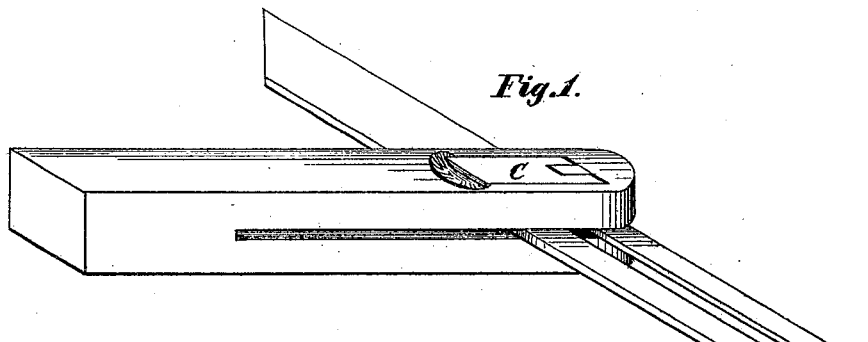
Fig. 1.
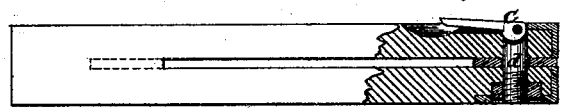
Fig. 2.
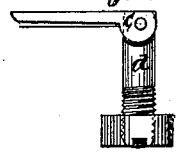
Fig. 4.
Fig. 3.
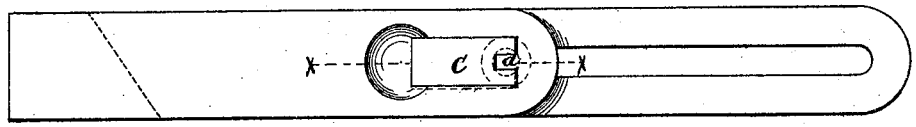
Fig. 6.
Fig. 5.
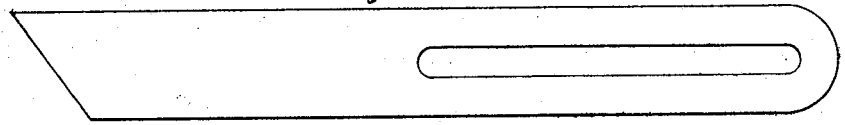
Witnesses:
J. B. Livingston.
Addie E. Wales.
Inventor
Willard C. Ellis

United States Patent Office.

WILLARD C. ELLIS, OF SPRINGFIELD, MASSACHUSETTS, ASSIGNOR OF ONE-HALF HIS RIGHT TO RUFUS A. RUSSELL, OF SAME PLACE.

Letters Patent No. 112,793, dated March 21, 1871.

IMPROVEMENT IN ADJUSTABLE BEVELS.

The Schedule referred to in these Letters Patent and making part of the same.

*To all whom it may concern:*

Be it known that I, WILLARD C. ELLIS, of Springfield, in the county of Hampden, in the State of Massachusetts, have invented a new and useful Improvement in Bevels.

The nature of my invention consists in an arrangement of a cam-lever, screw, and nut, combined for the purpose of securing the beam and blade of the bevel firmly together at any angle desired.

To enable others skilled in the art to make and use my invention, I will proceed to describe its construction and operation, reference being had to the annexed drawing making a part of this specification, in which—

Figure 1 is a perspective view;

Figure 2 is a side view; and

Figure 3, a top view of the different parts of my invention.

The cam-lever $c$ is attached to the screw $d$ by a pin passing through the top, forming a hinge, on which it vibrates up and down.

The screw $d$ is made of sufficient length to pass through the beam and blade of the bevel, and attached to its lower end is the nut $e$, by which the length of the screw $d$ is so adjusted that the cam $c$ may perform its proper functions.

I make a recess on the upper side of the beam to receive the cam-lever $c$ even with its surface when pressed down, and the lower side of beam is counter-bored so as to receive the nut $e$ flush with its lower surface.

Operation.

Raise the cam-lever $c$ to the perpendicular, which relieves the pressure from the blade. Set your bevel at the angle desired; then bring the cam-lever $c$ back to its place, when, if the regulating or adjusting-nut $e$ be properly adjusted, the blade will be held firmly in its place.

Claim.

What I claim is—

In combination with the beam and blade of a bevel, the device for adjusting the same, consisting of the nut $e$, screw $d$, and recessed cam-lever $c$, the parts being constructed and arranged substantially as shown.

WILLARD C. ELLIS.

Witnesses:
C. B. WELLS,
J. H. TAYLOR.